United States Patent [19]

Bittner et al.

[11] Patent Number: 5,039,506

[45] Date of Patent: Aug. 13, 1991

[54] METHOD OF PREPARING NA2S (I)

[75] Inventors: Friedrich Bittner, Bad Soden; Walter Hinrichs, Bruehl; Lutz Hippe, OberRamstadt; Ludwig Lange, Bruehl; Erich Splett, Huerth-Berrenrath, all of Fed. Rep. of Germany

[73] Assignee: Degussa Aktiengesellschaft, Frankfurt am Main, Fed. Rep. of Germany

[21] Appl. No.: 510,268

[22] Filed: Apr. 19, 1990

[30] Foreign Application Priority Data

Apr. 22, 1989 [DE] Fed. Rep. of Germany ....... 3913259

[51] Int. Cl.$^5$ ...................... C01B 17/00; C01B 17/22
[52] U.S. Cl. ................................. 423/565; 423/566.2
[58] Field of Search ............................. 423/565, 566.2

[56] References Cited

U.S. PATENT DOCUMENTS 4,640,832  2/1987  Bittner et al. ...................... 423/565

Primary Examiner—Gary P. Straub
Assistant Examiner—Timothy C. Vanoy
Attorney, Agent, or Firm—Beveridge, DeGrandi & Weilacher

[57] ABSTRACT

In a method of preparing sodium monosulfide by means of reacting sodium and sulfur under protective gas, the entire sodium determined for reaction is placed in a receiver in a first stage, preheated to temperatures of 100°–150° C., sulfur is gradually added in the required amount of the material in the receiver under intensive mixing, whereby the temperature of the reaction mixture is maintained at 120°–250° C., and in a second stage the formed initial product is allowed to react under continuation of the mixing at 250°–480° C., until a Na$_2$S content of at least 95% by weight has been attained.

10 Claims, No Drawings

METHOD OF PREPARING NA2S (I)

INTRODUCTION AND BACKGROUND

The present invention relates to a method of preparing sodium monosulfide by means of reacting sodium and sulfur under protective gas.

Sodium monosulfide, $Na_2S$, is an important reagent for introducing sulfur into organic molecules. Several methods are known according to which this compound can be prepared. It can be obtained e.g. by means of reacting sodium salts with hydrogen sulfide in aqueous or alcoholic solutions or by means of the reduction of sodium sulfate with carbon or hydrogen. The known methods share the common problem that products contaminated with reactants always accumulate which products must be separated from the impurities by being dissolved in suitable solvents and by filtration.

Since the elements sodium and sulfur react extremely vigorously with one another (enthalpy of formation for $Na_2S$: $\Delta H_B = -389.1$ kJ/mole), a method of preparation proceeding directly from the elements which are commercially available in great purity could not be used for industrial purposes in the past.

Moisture-free $Na_2S$ in sufficiently pure form was only obtainable by means of dewatering the hydrate $Na_2S \cdot 9 \cdot H_2O$ under an atmosphere of hydrogen. This hydrate had to be prepared by means of reacting sodium hydrogen sulfide with NaOH in a polar solvent (Kirk-Othmer, 3d edition (1982), vol. 18, pp. 793–847, especially pp. 803 and 809).

German patent application P 38 31 737.0 describes a method of preparing low sodium polysulfides and sodium in which the higher sodium polysulfide is placed in a receiver under protective gas in molten form and the sodium is charged into the molten melt in a stoichiometric proportion corresponding to the desired polysulfide product. Vigorous agitation is employed during the charging operation. Amounts are used such that the reaction mixture remains in the state of an agitatible suspension and the agitation is continued until the formation of the product has been completed. It would also be basically possible according to this known method to recover sodium monosulfide by providing the required stoichiometric proportion for the bound sulfur and the sodium. However, since the known method requires a melt as the reaction medium which consists at least in the final stage of the reaction of $Na_2S$ alone, an economically feasible reactor material would hardly be available. This is so as a consequence of the very high melting point of this compound (1180°–1200° C.) and on account of the strong chemical aggressivity of the melt.

A method reported in Synth. React. Inorg. Met.-Org. Chem. 14 (7), pp. 945–951 (1984) is likewise directed to the recovery of lower-melting sodium polysulfides, this known method concerns a reaction of molten sodium placed in a receiver with added sulfur. However, in this prior method a molten intermediary product is obtained which is contaminated with sodium and substances of unknown composition. This product must then be ground to a powder after separation of the non-reacted sodium in a separate method step and further processed to the final product after reintroduction of the previously separated sodium and addition of more sulfur under renewed melting of the polysulfide produced.

SUMMARY OF THE INVENTION

An object of the invention is to provide a method of preparation in which a high-percentage sodium monosulfide can be economically prepared from the elements sodium and sulfur without requiring a reaction medium in molten form present in the reaction system and using relatively low reaction temperatures.

In achieving the above and other objects, one feature of the invention resides in a method of preparing sodium monosulfide by means of reacting sodium and sulfur under a protective gas in stages. In a first stage the entire sodium determined for reaction is placed into a receiver, preheated to temperatures of 100°–150° C. Then liquid or solid sulfur, the latter preferably in the form of broken, solidified melt, is gradually added in the required amount to the material in the receiver under intensive mixing, preferably under kneading and/or grinding. The temperature of the reaction mixture is then maintained at 120–250, preferably 140°–200° C. Then in a second stage the initially formed initial product, which is colored bluish-black, is allowed to continue to react or postreact under continuation of the mixing at a temperature in the range of 250–480, preferably 350°–400° C., until a $Na_2S$ content of at least 95% by weight has been attained.

Inert gas, preferably argon, is used as protective gas. The selection of the correct reactor material is also significant here. According to an advantageous embodiment of the invention, the reaction is carried out in a reactor wherein those parts or sections which come in contact with the reaction mixture are formed of aluminum alloys, especially AlMg3 or AlMn or sintered alumina or SiC or of glassy carbon. Alternatively, the reactor parts can be coated or jacketed with these materials.

DETAILED DESCRIPTION OF THE INVENTION

A particularly important aspect of the method of the invention resides in the use of mixing devices with which the reaction mixture, which passes through various consistency stages in the course of the reaction, can be comminuted as intensively as possible and thoroughly mixed. Devices with kneading and/or grinding action have proven to be especially useful for this purpose. Examples are trough kneaders or mixers with oppositely directed kneading blades and agitator ball mills.

In kneaders, the kneading surfaces should always be covered by the sodium placed in the receiver (in the initial stage of the reaction) and by the initial product formed, which is colored dark to grey, (in the continuing reaction) in order to avoid corrosion of equipment by the aggressive reaction mixture.

The reactor contents passes through various characteristic stages of consistency and coloration during the carrying out execution of the method of the invention:

The initial starting material consists in the first method stage of liquid, silver-colored sodium at 100°–150° C.

If solidified sulfur melt is used, it is broken into particles of 10–100 mg by weight and the scraps of broken material are dosed into the receiver in such a manner that a reactor temperature of 120°–250° C. can be maintained, with exterior cooling if necessary.

After a charging of approximately 10% of the stoichiometrically required amount of sulfur, the reactor contents exhibits a gritty consistency and is colored dark grey.

After charging of approximately 25–30% of the required sulfur, the reactor contents exhibit a pudding-like consistency and is colored medium grey.

After charging of approximately 50% of the required sulfur, the reactor contents exhibits a crumbly consistency and is colored light grey.

During the charging of the remaining sulfur, the reactor contents becomes powdery and its color turns to dark to bluish-black.

In the second method stage, the heating to 250°–480° C. with continued comminuting mixing, the powdery nature of the reactor contents remains and the color turns from bluish-black to white.

The method of the invention purposely accepts the accumulation of non-molten solid substance in the initially liquid reaction medium, in contrast to the initially discussed methods for preparing low polysulfides. The reaction of the invention between the elements sodium and sulfur is controlled so as to obtain conversions up to approximately 97% of theory at temperatures which are far below the melting point of the final product (about 1200° C.).

Of course, any desired polysulfide can also be obtained from the high-percentage sodium monosulfide obtained by means of melting it together with the appropriate amounts of sulfur.

The invention is explained in more detail below with reference to an illustrative embodiment.

EXAMPLE

A laboratory kneading machine with a trough of V4A formed from two semicylinders with polished inner walls was equipped with two polished blades of V4A in sigma form mounted in each instance on its own drive shaft.

The lower trough part was equipped with a double jacket for receiving a heat conducting medium. The screwed-on cover of V4A was provided with a connecting piece which was able to be closed with a screw cap and with an introductory tube for the protective gas argon terminating immediately underneath the cover. Both sodium and sulfur were filled in and the initial product removed through the connecting piece.

The blade speed could be varied between 40–60 rpms. A temperature sensor protective tube consisting of V4A was introduced into the trough or the reaction space through one of the four side walls parallel to the shafts on which the blades were mounted. The clear interior length of the trough was 100 mm, its clear width 117 mm and its clear depth 110 mm. The useful volume of this trough was 750 ml. Accordingly, this trough was able to receive approximately 500 g of initial product.

Prior to the start of the batchwise production, the trough was heated, whereby its lower part was loaded with heat-conducting oil with a temperature of 160° C. The trough was washed with approximately 20 l argon per hour. Thereafter, 176.9 g liquid sodium were charged in.

Sulfur was dosed in small pieces of solidified melt into the liquid sodium through the connecting piece closable with a screw cap. At the start, the amount of sulfur per portion was approximately 100 mg. It was increased during the course of the reaction to approximately 1 g per portion.

The dosing of the sulfur was regulated in such a manner that the temperature in the reaction space did not rise higher than 160° C. The temperature of the heat conducting oil was lowered to 150° C.

The blade speed remained constant at 50 rpms during the portion-by-portion addition of a total of 123.1 g sulfur over a period of approximately 3.5 hours. After the addition of approximately 40 g sulfur, the reaction mixture thickened visibly and swelled up. The reaction mixture retained this consistency until shortly before the end of the dosing of sulfur. After approximately 110 g sulfur had been added into the reaction mixture, the mixture became dry and assumed a bluish-black coloration upon the addition of the remaining, stoichiometrically required amount of sulfur. A specimen was taken after the initial product had cooled off.

An analysis yielded:
58.7% by weight total sodium (theoret. 59.0%)
41.3% by weight total sulfur (theoret. 41.0%).

Of the total sulfur, 37.2% sulfur is present in the initial product in the form of the sulfide. The determination of sulfide was performed iodometrically. The total sulfur content was determined after oxidation of the sulfur with $H_2O_2$ in an alkaline medium to the sulfate gravimetrically as $BaSO_4$.

The total sodium content was determined with flame photometry. Sodium which had not participated in the reaction was detected gasometrically. An amount of 2% by weight relative to the reaction mixture was found hereby. The initial product, which contained more than 90% by weight sodium monosulfide, was placed in a laboratory reactor which was able to be heated up to approximately 400° C. for the postreaction of the constituents sodium and sulfur which had not yet reacted to the sulfide.

The cylindrical laboratory reactor consisting of the aluminum alloy AlMg3 with a bottom plate comprised of a flanged-on cover, likewise of AlMg3, with a connecting piece closable by a screw cap, with an introductory tube for the protective gas argon terminating under the cover, with a temperature sensor protective tube and a stuffing box in the cover for running through the vertically standing blade agitator shaft which was jacketed with AlMg3 and on which the agitator blades of AlMg3 were fastened. The reactor exhibited a clear height of 150 mm and a clear width of likewise 150 mm.

In order to achieve an optimum agitator action in the laboratory reactor, the amount of 300 g initial product had to be doubled. Therefore, the same amount was prepared once again in the manner just described in the laboratory kneading machine.

After 600 g of the black, powdery product from the 2 batches had been charged in, the reactor, provided with a heat insulation jacket, was placed on an infinitely variable electric heating plate and evenly heated to 370° C. during the course of 1.5 h. The initial product was intensively agitated during the heating. The agitator speed was adjusted to 100 rpms. A strong agitating motor was required for this since the initial product tended to form clumps after 300° C. The reactor was washed during the heating and the postreaction with a current of inert gas of 30 l per hour.

After cooling, the final product, which was now white, was removed from the reactor and sieved. The mesh size of the sieve was 0.355 mm. Approximately 75% of the sieved reaction product was recovered thereby as homogeneous, white powder.

An analysis yielded the following composition:
59.0% by weight Na (theoret. 58.97% by weight)
41.0% by weight S (theoret. 41.03% by weight).

The coarse-grained fraction (sieve retainings) exhibited the composition $Na_2S$; however, it was inhomogeneous as regarded the sulfur content of the individual grains, that is, the grains contained in part slight amounts of polysulfide (approximately 1–5% by weight).

The following quantitative balance results from that which has just been described:

Sodium placed in the kneader (total): 353.8 g
Sulfur added (total): 246.2 g
Production of initial product: 600 g
Amount placed in laboratory reactor: 600 g init. prod.
Amount removed from laboratory reactor: 600 g final prod.
Sieve fraction <0.355 mm: 450.0 g $Na_2S$;
Remainder of inhomogeneous grain fraction >0.355 mm: 150 g The inhomogeneous grain fraction >0.355 mm from the method of preparing $Na_2S$ was collected and supplied to the kneader for the first conversion stage. After one hour of grinding at 50 rpms under an atmosphere of argon, a fine powder was obtained which can be placed in the kneader and used for a new batch.

Further variations and modifications of the foregoing will be apparent to those skilled in the art and are intended to be encompassed by the claims appended hereto.

We claim:

1. A method of preparing sodium monosulfide by reacting sodium and sulfur under protective gas, comprising in a first stage determining the entire amount of sodium required for reaction, placing said amount in said 100°–150° C., gradually adding liquid or solid sulfur in a determined required amount to the said sodium in said receiver means, intensively mixing said sodium and sulfur wherein the temperature of the reaction mixture is maintained at 120°–250° C., to form an initial product which is colored bluish-black;

and in a second stage, treating the formed initial product at a temperature of 250°–480° C., while intensively mixing until $Na_2S$ is obtained.

2. The method according to claim 1 wherein intensively mixing is kneading and/or grinding.

3. The method according to claim 1 wherein said sulfur is added in the form of broken, solidified melt.

4. The method according to claim 1 wherein the temperature of the reaction mixture in first stage is maintained at 140°–200° C.

5. The method according to claim 1 wherein in the second state the temperature is 350°–400° C.

6. The method according to claim 1 wherein the sulfur is added in portions.

7. The method according to claim 6 wherein after first 10% of the sulfur is added, the reaction mixture exhibits a gritty consistency and is colored dark gray.

8. The method according to claim 6 wherein after charging about 25–30% of the sulfur the reactor contents exhibits a pudding like consistency and is colored medium gray, thereafter charging sulfur until about 50% sulfur is present and continuing mixing until the reaction mixture is a crumbly consistency and is colored light gray, then charging the remaining sulfur and mixing until the mixture is powdery and colored dark to bluish-black.

9. The method according to claim 6 wherein the mixing in the second stage is continued until the mixture remains powdery and turns white.

10. The method of claim 1, wherein said $Na_2S$ has a $Na_2S$ content of at least 95% by weight.

* * * * *